(12) United States Patent
Gurin

(10) Patent No.: US 8,826,638 B1
(45) Date of Patent: Sep. 9, 2014

(54) HYBRID SUPERCRITICAL CARBON DIOXIDE GEOTHERMAL SYSTEMS

(76) Inventor: Michael Gurin, Glenview, IL (US)

(*) Notice: Subject to any disclaimer, the term of this patent is extended or adjusted under 35 U.S.C. 154(b) by 196 days.

(21) Appl. No.: 13/569,177

(22) Filed: Aug. 7, 2012

Related U.S. Application Data

(60) Provisional application No. 61/526,260, filed on Aug. 22, 2011.

(51) Int. Cl.
*F02C 5/00* (2006.01)
*F03G 7/00* (2006.01)
*B60K 16/00* (2006.01)
*F01K 13/00* (2006.01)
*F01K 3/18* (2006.01)
*F01K 25/10* (2006.01)
*F25J 3/00* (2006.01)

(52) U.S. Cl.
CPC ............... *F01K 3/18* (2013.01); *F01K 25/103* (2013.01); *Y02E 10/10* (2013.01); *Y02E 10/46* (2013.01); *F25J 3/00* (2013.01)
USPC ............ 60/39.6; 60/641.2; 60/641.8; 60/676; 60/698

(58) Field of Classification Search
CPC ............... B01J 7/00; F01K 3/18; F01K 3/24; F01K 25/10; F01K 25/103; F01K 25/065; F25J 3/00; F25J 3/02; C07C 7/00; C07C 7/10; C07C 7/11; Y02E 10/10; Y02E 10/40; Y02E 10/46; F02G 1/00
USPC ............... 60/39.01, 774, 39.6, 641.2–641.4, 60/641.8–641.15, 676, 698
See application file for complete search history.

(56) References Cited

U.S. PATENT DOCUMENTS

| | | | | |
|---|---|---|---|---|
| 4,186,559 A * | 2/1980 | Decker et al. | | 60/531 |
| 4,283,211 A * | 8/1981 | Ehrlich et al. | | 62/4 |
| 4,765,143 A * | 8/1988 | Crawford et al. | | 60/671 |
| 7,900,450 B2 * | 3/2011 | Gurin | | 60/641.2 |
| 2010/0043433 A1 * | 2/2010 | Kelly | | 60/641.2 |
| 2012/0001429 A1 * | 1/2012 | Saar et al. | | 290/52 |

* cited by examiner

*Primary Examiner* — Hoang Nguyen

(57) ABSTRACT

Provided herein are geothermal power generating systems utilizing supercritical carbon dioxide as a working fluid and superheating the extracted the emitted carbon dioxide utilizing external combustion of the hydrocarbons concurrently extracted with the emitted carbon dioxide to increase enthalpy and thermodynamic cycle efficiency. Methods for producing power are also provided.

20 Claims, 5 Drawing Sheets

HYBRID SUPERCRITICAL CARBON DIOXIDE GEOTHERMAL SYSTEMS

CROSS-REFERENCE TO RELATED APPLICATIONS

This application claims the benefit of provisional patent application U.S. No. 61/526,260 titled "Hybrid Supercritical Carbon Dioxide Geothermal Systems" filed on Aug. 22, 2011, and hereby incorporated by reference in its entirety.

FIELD OF THE INVENTION

The present invention generally relates to power generation utilizing thermal energy first as extracted from a geothermal source and secondly from concurrent hydrocarbons extracted from the same geothermal source subsequently combusted to superheat the carbon dioxide working fluid utilized both from the geothermal source and within the thermodynamic cycle of the power generation system. In all embodiments, the present invention utilizes at least one power generating cycle producing $CO_2$ containing emissions and with at least one power generating cycle using supercritical carbon dioxide "$ScCO_2$" as a working fluid and solubilizes hydrocarbons that are concurrently extracted from the geothermal source.

BACKGROUND OF THE INVENTION

Energy efficiency has important impact on both economics of operating costs and carbon dioxide "$CO_2$" emissions. The production of power from hydrocarbon fuels and from geothermal thermal sources are individually known in the art. The combustion of fuels, whether it be hydrocarbons, biomass, biofuels, or coal as known in the art yields $CO_2$ emissions. It is known in the art that these $CO_2$ emissions can reach elevated pressures as sufficient for injection into a geothermal injection well by a wide range of compressors, pumps, etc. as known in the art. One such source of carbon dioxide is the combustion of coal or hydrocarbons for a wide range of applications ranging from dedicated power generation systems to industrial processes.

Traditional power generation cycles using supercritical carbon dioxide "$ScCO_2$" have distinct challenges associated with at least one of $CO_2$ leakage from the otherwise closed loop cycle, and the direct impact of $CO_2$ within the high pressure side of the closed loop cycle on the low pressure side of the closed loop cycle and vice versa.

Traditional power generation cycles using $ScCO_2$ heated by a geothermal source such that the $ScCO_2$ is the working fluid in the power generation cycle and a geothermal heat transfer fluid is the fluid extracting thermal energy from the geothermal source are both known in the art. Additionally, the use of $ScCO_2$ as both the working fluid in the power generation cycle and the geothermal heat transfer fluid (i.e., the "same" $ScCO_2$ is used for both) is also known in the art.

The combined limitations of existing power generation systems utilizing $ScCO_2$ as the working fluid include, though not limited to, $CO_2$ leaks, insufficient high-side temperature (i.e., insufficiently high geothermal source temperatures), or fluid components or combustion byproducts of those fluid components that are concurrently extracted from the geothermal extraction well that are condensed within the power generation expander.

SUMMARY OF THE INVENTION

The present invention preferred embodiment relates to the combustion of solubilized hydrocarbons to increase enthalpy and exergy of a $ScCO_2$ power generation system. In the preferred embodiment, the combustion byproducts include $CO_2$ that is subsequently injected into the geothermal injection well to minimize $CO_2$ requirements to make up for geothermal leaks, geothermal mineral carbonation, and power generation working fluid leaks all if which consume or contribute to $CO_2$ losses.

Another embodiment incorporates a dual stage expander to enable maximum energy extraction of the $CO_2$ and the combustion byproducts injected into the $CO_2$ working fluid, and the subsequent reduction of condensables (i.e., a portion of the combustion byproducts e.g., water) prior to reaching a second stage expander.

Yet another embodiment incorporates a ceramic expander, preferably a ramjet expander, to enable maximum energy extraction of the $CO_2$ and the combustion byproducts injected into the $CO_2$ working fluid, such that the condensables (i.e., a portion of the combustion byproducts e.g., water) limit any damage within the expander, and virtually eliminate the requirement to separate condensables from the $CO_2$ working fluid post-expander.

DETAILED DESCRIPTION OF THE INVENTION

Figure 1:
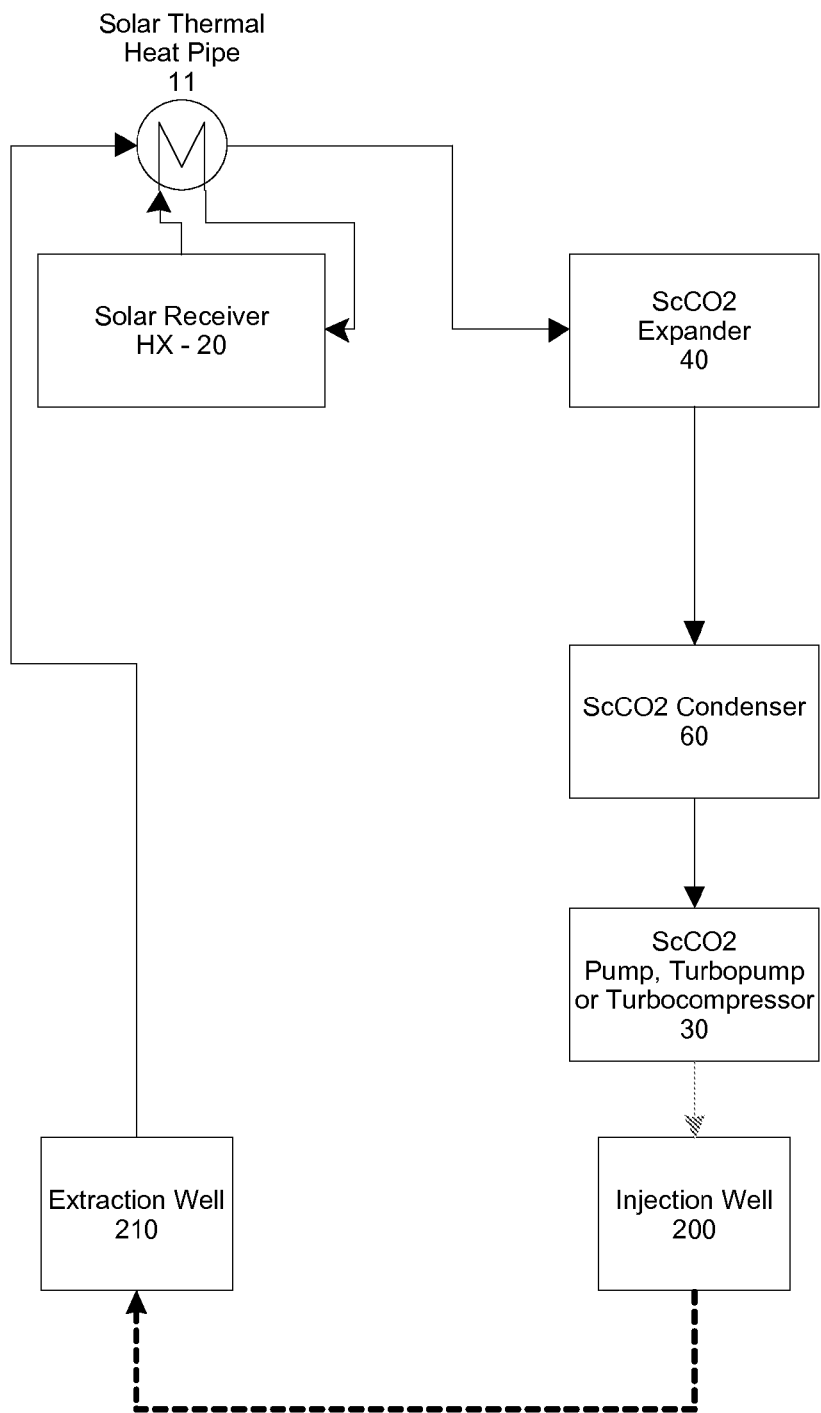
FIG. 1 is a sequential flow diagram of one embodiment of a geothermal source power generation system utilizing an external thermal source, in this example being a solar energy through a $CO_2$ receiver and heat pump, in accordance with the present invention.

The term "in thermal continuity" or "thermal communication", as used herein, includes the direct connection between the heat source and the heat sink whether or not a thermal interface material is used.

The term "fluid inlet" or "fluid inlet header", as used herein, includes the portion of a heat exchanger where the fluid flows into the heat exchanger.

The term "fluid discharge", as used herein, includes the portion of a heat exchanger where the fluid exits the heat exchanger.

The term "expandable fluid", as used herein, includes the all fluids that have a decreasing density at increasing temperature at a specific pressure of at least a 0.1% decrease in density per degree C.

The term "working fluid" is a liquid medium utilized to convey thermal energy from one location to another. The terms heat transfer fluid, working fluid, and expandable fluid are used interchangeably.

The term "supercritical" is defined as a state point (i.e., pressure and temperature) in which a working fluid is above its critical point. It is understood within the context of this invention that the working fluid is supercritical at least on the high side pressure of a thermodynamic cycle, and not necessarily on the low side of the thermodynamic cycle.

The term "ramjet" is a rotary device that eliminates the need for a conventional bladed compressor (when a ramjet compressor) and turbine (when a ramjet expander) as used in traditional gas turbine engines. One embodiment of a ramjet is an inside-out supersonic circumferential rotor having integrated varying-area shaped channels in its radially inward surface, in which compression, combustion and expansion occur. The "inside-out" design places all rotating parts under compressive centrifugal loading.

The term "CO2 source" is an air composition that contains carbon dioxide ranging from 5 percent on a mass fraction basis to a highly enriched air composition up to 100 percent on a mass fraction basis.

The term "fuel" is a chemical reactant that is exothermic during an oxidation reaction. In this invention, it is preferred to be a solubilized hydrocarbon.

The term "CO2 capture system" is a method of effectively isolating carbon dioxide from an air composition, such as combustion exhaust, by any method ranging from carbonation chemical reaction, adsorption, or absorption. The process of isolating carbon dioxide is reversible such that an increase of temperature beyond a critical point changes the equilibrium point.

The term "recuperator" is a method of recovering waste heat downstream of an expander and transferring the thermal energy upstream of either a compressor, turbocompressor or pump.

The term "exhaust port" is any method capable of discharging a working fluid that can include safety valve, pressure regulated valve, expansion device venting to atmosphere, etc.

The term "pressure increasing device" is any device capable of increasing the pressure of a working fluid, include a turbocompressor, turbopump, compressor, or pump.

The term "expander" is any device capable of decreasing the pressure of a working fluid, including a turboexpander, piston, or ramjet expander while converting the expansion energy into mechanical energy (and potentially then to electricity).

The term "high-side" is the high pressure side of a closed loop thermodynamic cycle such that the high-side is downstream of a pressure increasing device and upstream of an expander device.

The term "low-side" is the low pressure side of a closed loop thermodynamic cycle such that the low-side is downstream of an expander device and upstream of a pressure increasing device.

Here, as well as elsewhere in the specification and claims, individual numerical values and/or individual range limits can be combined to form non-disclosed ranges.

Exemplary embodiments of the present invention will now be discussed with reference to the attached Figures. Such embodiments are merely exemplary in nature. Furthermore, it is understand as known in the art that sensors to measure thermophysical properties including temperature and pressure are placed throughout the embodiments as known in the art, most notably positioned to measure at least one thermophysical parameter for at least one thermodynamic state point. The utilization of valves as standard mass flow regulators is assumed (i.e., not depicted) to be as known in the art and can also include variable flow devices, expansion valve, turboexpander, two way or three way valves. The utilization of methods to remove heat from the working fluid by a condensor (used interchangeably with condenser) is merely exemplary in nature as a thermal sink and can be substituted by any device having a temperature lower than the working fluid temperature including absorption heat pump desorber/generator, liquid desiccant dehumidifier, process boilers, process superheater, and domestic hot water. With regard to FIGS. 1 through 5, like reference numerals refer to like parts.

It is understood that virtually every embodiment of this invention can start with CO2 sourced by industrial or power generation processes such as calciners, high temperature furnaces, and fuel combustors respectively.

Every configuration and embodiment has a control system and method of control to operate the power generation cycle(s) and to obtain optimal control of a geothermal and externally superheated ScCO2 cycle.

The availability of geothermal energy is recognized as a relatively steady state thermal source of energy subsequently utilized to convert thermal into mechanical energy through a Rankine thermodynamic cycle. It is also recognized by prior art that carbon dioxide reacts with minerals, often found within the earth's surface, to yield an exothermic reaction. It is also recognized that carbon dioxide, particularly supercritical carbon dioxide "ScCO2" is a solvent for many organic fluids, such as hydrocarbons present in the earth's surface. Therefore the combination of carbon dioxide as a working fluid within a semi-open geothermal loop has the ability to increase the temperature of the returning ScCO2 greater than alternative Rankine cycle working fluids. And concurrently has the ability to return solubilized hydrocarbons, plus additional fluid constituents (e.g., water, minerals, etc.). It is understood that supercritical carbon dioxide is an excellent solvent for a wide range of materials, notably hydrocarbons.

This invention preferably combines the exothermic reaction of mineral carbonation with the exothermic oxidation reaction of the solubilized hydrocarbons as a method to increase the high-side temperature of the Rankine cycle, which yields greater energy production per mass flow of ScCO2. It is understood that solubilized hydrocarbons Turning to FIG. 1, FIG. 1 depicts an in-situ geothermal thermal loop in series with a subsequent solar receiver where the geothermal loop, solar loop, and Rankine cycle all have the same working fluid to generate power. The solar loop, which is comprised of at least one solar receiver heat exchanger 20 operable to increase the enthalpy of the ScCO2 working fluid. The now superheated, relative to the fluid directly from the geothermal extraction well 210, increases the operating efficiency of the Rankine cycle by at least 5 percent, more preferably by at least 10 percent, and more specifically by at least 20 percent. The solar receiver 20 is optimally configured in a heat pipe configuration such that the condenser herein labeled as solar thermal heat pipe 11 is above the solar receiver. It is understood in the art that the solar receiver HX 20 can be flat panels, parabolic trough, or tower and/or combinations thereof. The now superheated ScCO2, which is downstream of the solar thermal heat pipe 11 (acting as condenser) is in fluid communication with the ScCO2 expander 40. The now low pressure ScCO2 continues to the ScCO2 condensor 60 prior to reaching the ScCO2 pump 30 (which can also be a turbopump, or even a turbocompressor if operating as a Brayton cycle instead of Rankine cycle). The ScCO2 at this point is high pressure prior to being injected in the injection well 200.

Figure 2:
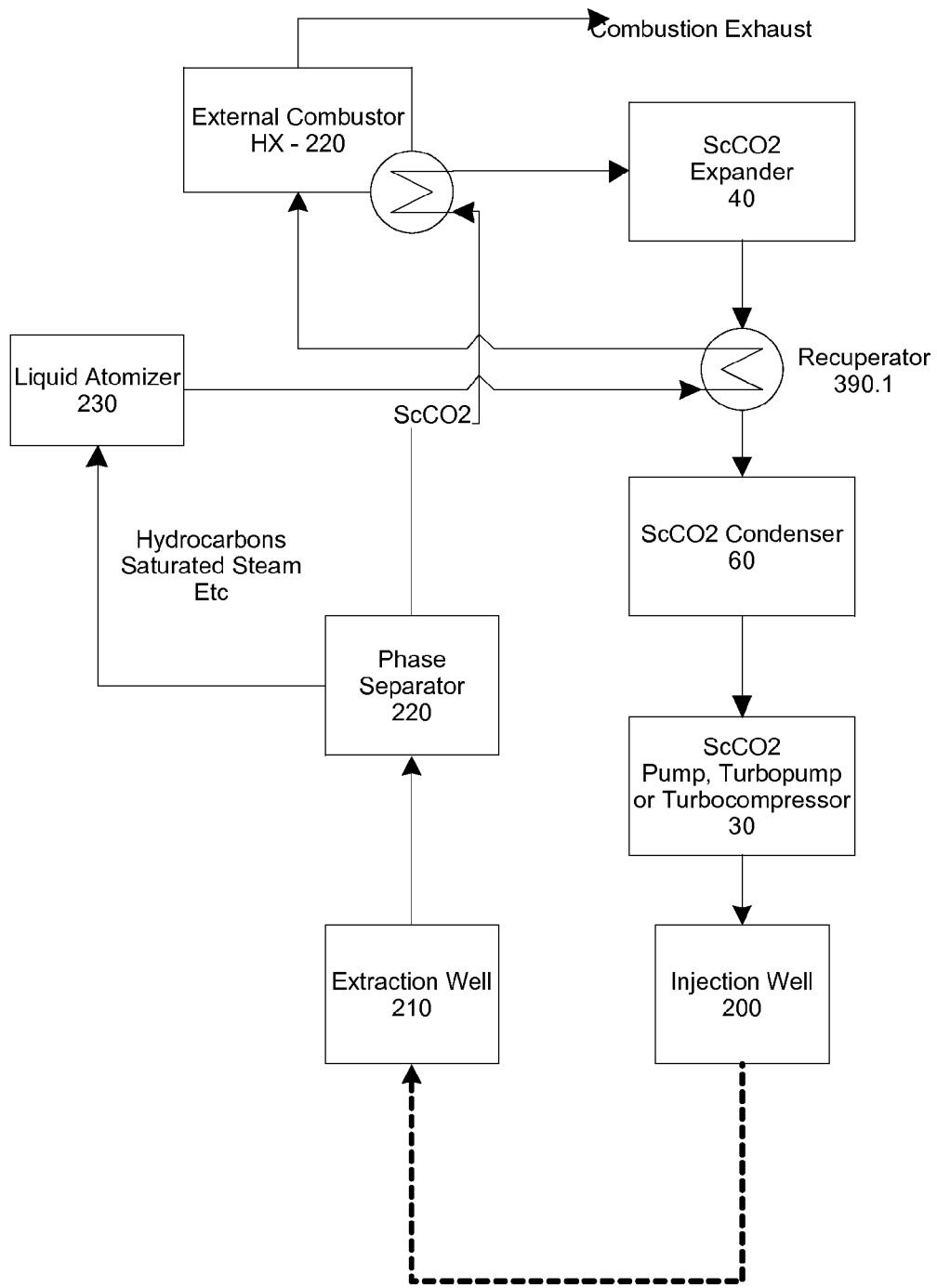
FIG. 2 is a sequential flow diagram of one embodiment of a geothermal source power generation system utilizing an external thermal source, in this example being hydrocarbon combustion solubilized within the $CO_2$ working fluid of the power generation system, in accordance with the present invention.

Turning to FIG. 2, FIG. 2 depicts an in-situ geothermal thermal loop such that working fluid out of the extraction well 210 is comprised of at least 0.5 percent of hydrocarbons (and preferably greater than 1 percent, more preferred greater than 5 percent by volume) having an energy content greater than 5 percent by enthalpy over the working fluid itself (and preferably greater than 10 percent, and more specifically preferred greater than 20 percent) in which the hydrocarbons are separated from the working fluid for subsequent combustion. One of the preferred embodiments is such that the phase separator 220 is immediately downstream of the extraction well 210. The phase separator 220 can be any type of separator as known in the art, including such devices as membrane filters, or centrifugal fluid isolators. The phase separator 220 isolates at least 50 percent of hydrocarbons from the working fluid (and preferably at least 80 percent of hydrocarbons). It is understood that the hydrocarbons can still contain water/steam, though preferably the phase separator isolates the hydrocarbons from the working fluid and also from the water/steam. The hydrocarbons then enter an optional liquid atomizer 230, which as known in the art is any method to reduce particle size of the emitted hydrocarbons as a means to increase combustion efficiency, and then enters an optional recuperator 390.1 operable to preheat the hydrocarbons prior to entering the external combustor HX 220. The preferred embodiment is such that the hydrocarbons are diluted with at least 10 percent by volume, such as with ScCO2, to enhance combustion efficiency. This embodiment has the combustion exhaust being vented to atmosphere downstream of the external combustor HX 220. The ScCO2 (at least concentrated CO2) downstream of the phase separator 220 enters the external combustor HX 220 to increase the enthalpy of the ScCo2 working fluid upstream of the ScCO2 expander 40. The external combustor 220 is operable to increase the enthalpy of the ScCO2 working fluid. The now superheated, relative to the fluid directly from the geothermal extraction well 210, increases the operating efficiency of the Rankine cycle by at least 5 percent, more preferably by at least 10 percent, and more specifically by at least 20 percent. The external combustor can also be configured as a thermal heat pipe in the same manner as in FIG. 1. As noted earlier, the now expanded ScCO2 working fluid (subcritical when operable as a Rankine cycle, or supercritical when operable as a Brayton cycle) enters the optional recuperator 390.1 prior to entering the ScCO2 condensor 60, and then prior to entering ScCO2 pump (which can also be a turbopump, or even a turbocompressor if operating as a Brayton cycle instead of Rankine cycle). The now high pressure working fluid enters the injection well 200 to begin the cycle anew. It is understood that the hydrocarbons are mixed with an oxidant source, most notably atmospheric air at a stoichiometric excess to ensure full combustion of the hydrocarbons as known in the art.

Figure 3:
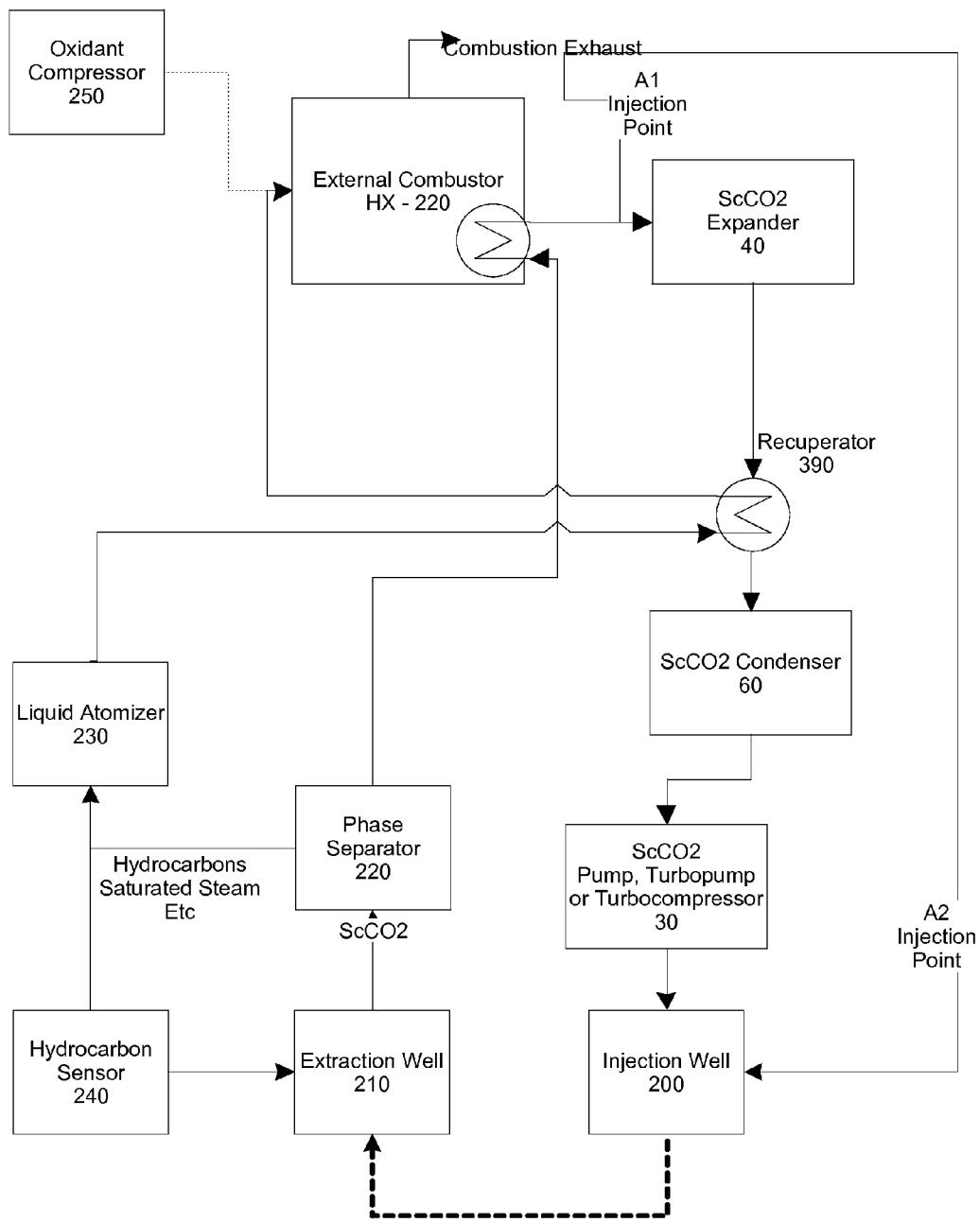
FIG. 3 is another sequential flow diagram of one embodiment of a geothermal source power generation system utilizing an external thermal source, in this example being hydrocarbon combustion solubilized within the $CO_2$ working fluid of the power generation system, in accordance with the present invention.

Turning to FIG. 3, FIG. 3 is identical to FIG. 2 with the following exceptions. These exceptions include: a) placement of hydrocarbon sensors 240 as known in the art to detect mass or volumetric fraction of hydrocarbons physically placed at least at the extraction well 210 and/or upstream of the liquid atomizer 230 and downstream of the phase separator 220 (or at any point upstream of the external combustor HX 220, preferably further away so as to provide more time to calculate the stoichiometric ratio between oxidant source and hydrocarbon content); b) oxidant compressor 250 for injection of the oxidant source into the external combustor HX 220; and c) combustion exhaust is not vented to atmosphere but rather injected at either (or both) upstream of the ScCO2 expander 40 (A1 injection point) or immediately upstream of the injection well 200 (A2 injection point). Though not shown, it is feasible to inject the combustion exhaust within the low pressure side of the Rankine cycle such that the then subsequent ScCO2 pump has the ability to prepare the CO2 for well injection. The configuration in FIG. 3 has numerous advantages which include reduced requirement of ScCO2 (from any source, particularly when purchased or piped from a remote location), reduced CO2 emissions to the atmosphere, and increased power generation by expanding supercritical combustion byproducts into a lower but still supercritical pressure at a pressure of at least 5 psi greater than the injection well 200 pressure.

Figure 4:
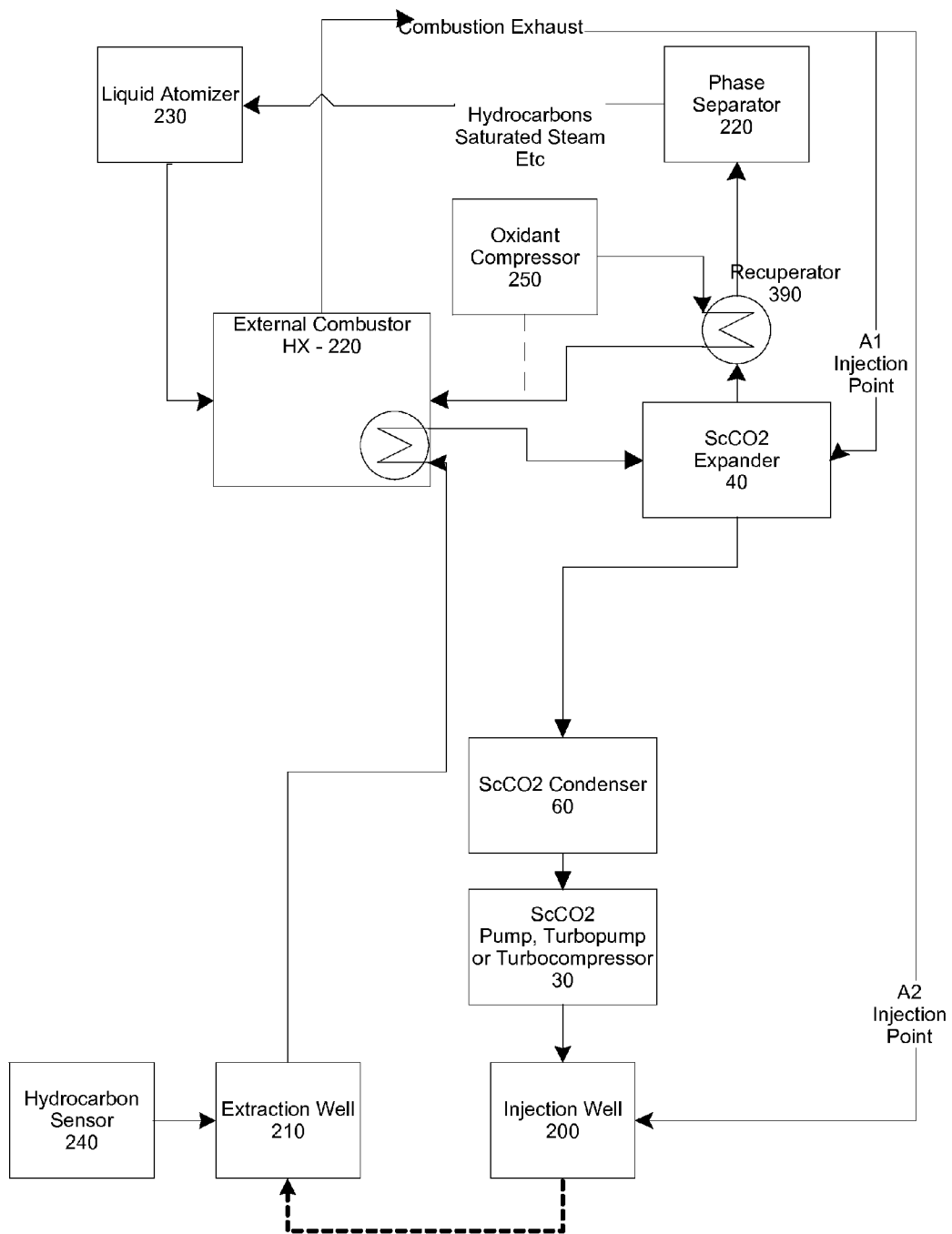
FIG. 4 is another sequential flow diagram of one embodiment of a geothermal source power generation system utilizing an external thermal source, in this example being hydrocarbon combustion solubilized within the $CO_2$ working fluid of the power generation system, in accordance with the present invention.

Turning to FIG. 4, FIG. 4 is virtually identical to FIG. 3 with the only exception being the oxidant compressor 250 (i.e., air compressor or oxygen compressor) is preheated by thermal energy as obtained by the recuperator 390 which receives CO2 working fluid downstream of the ScCO2 expander 40 and upstream of the phase separator 220.

Figure 5:
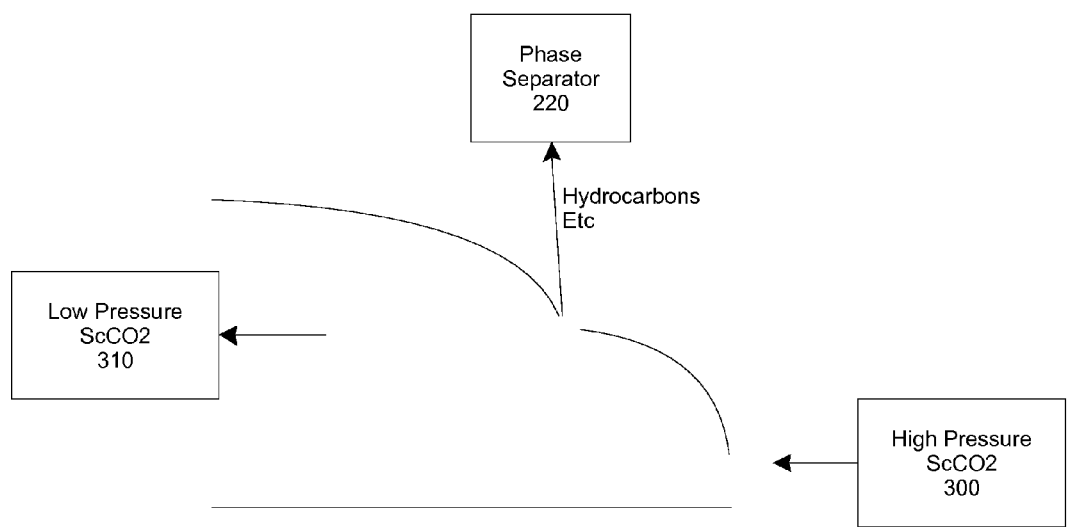
FIG. 5 is a flow diagram of one embodiment of a geothermal source power generation system utilizing a dual stage expander with condensables being discharged in between the 2 stages, in accordance with the present invention.

Turning to FIG. 5, FIG. 5 depicts a preferred expander (shown as ScCO2 expander 40 in aforementioned FIGS. 1-4) that is a combination centrifugal phase separator and expander. The high pressure working fluid 300, which in this embodiment is ScCO2, enters the expander through a volute as known in the art. The higher density components (e.g., hydrocarbons, water/steam, etc.) are centrifugally distributed to the outwardly radial inner wall of the expander. The now higher density components exit a break in the outwardly radial inner wall thus acting as in an identical manner as depicted within this figure as phase separator 220 (and also in other aforementioned figures). The ScCO2 fraction of the working fluid continues to expand within the expander until it finally reaches the exit of the expander at a low pressure ScCO2 volute 310. The particularly preferred embodiment of the centrifugal expander is an inside-out ramjet expander operable at rotation speeds "RPM" producing larger than 100 gravitational field force, preferably greater than 1000 gravitational field force, more preferred greater than 10,000 gravitational field force, and specifically preferred greater than 100,000 gravitational field force. The high gravitational field force enhances both the speed of phase separation and importantly eliminating the requirement for two distinct devices with one being expander and second being phase separator.

The preferred embodiment of the invention is a geothermal energy system that achieves superior performance by the inclusion of external combustion of hydrocarbons that are concurrently extracted with the working fluid of the power generation cycle, which is primarily carbon dioxide. It is understood that the extraction of the carbon dioxide containing working fluid includes a wide range of solubilized component fractions notably hydrocarbons. Additional component fractions include water (or steam as dependent on working fluid temperature and pressure) and minerals notably carbonates. The geothermal power generator, hereby known as the reference power generator or first power generator configuration does not include the external combustor that combusts the co-extracted hydrocarbons. The thermodynamic cycle has a preferred high-pressure side with a pressure greater than 1500 psi, particularly preferred greater than 2000 psi, and specifically preferred greater than 2500 psi. The thermodynamic cycle has a preferred low-pressure side pressure lower than 800 psi, particularly preferred lower than 700 psi, and specifically preferred lower than 650 psi.

The external combustor contains an exothermic oxidation reaction between the solubilized co-extracted hydrocarbons with an oxygen containing gas. The preferred oxygen containing gas is air, the particularly preferred oxygen containing gas has an oxygen composition fraction greater than 25%, and the specifically preferred oxygen containing gas has an oxygen composition fraction greater than 85%. It is understood that the lower the oxygen concentration leads to a combustion exhaust fraction that has a relatively higher fraction of non-condensable gases. The presence of these non-condensable gases present cavitation challenges in the pump of the thermodynamic cycle. It is understood, though not depicted in the figures, as known in the art that the inclusion of de-aerator upstream of the pump approximately removes the non-condensable gases. It is further understood that the utilization of an inside-out ramjet, as known in the art and comparable to the inside-out ramjet expander, can be a compressor/pump. The particularly preferred compressor/pump is manufactured using ceramic components, and the specifically preferred compressor/pump is manufactured using ultra-hard ceramic components approximately immune to cavitation damage. Furthermore, it is preferred that the oxidant is compressed to a pressure above the high-pressure side of the thermodynamic cycle. This has the further advantage of enabling the combustion exhaust to be utilized within the thermodynamic cycle reducing the concerns or challenges of carbon dioxide replenishment to overcome carbon dioxide leaks within the system notably compressor/pump and expander(s). An additional advantage of supercritical combustion is such that additional thermal energy is transformed into mechanical energy to increase power production.

Another preferred embodiment of the invention is such that the condenser within the thermodynamic cycle is not (i.e., void) of an atmospheric air condenser. The particularly preferred condenser is a wet condenser, and the specifically preferred condenser utilizes cold water as extracted from a water source approximately at the surface. The preferred depth is less than 2000 feet deep, the particularly preferred depth is less than 1000 feet deep, and the specifically preferred depth is less than 500 feet deep.

Utilization of the aforementioned invention as disclosed is a superior method of producing power from a geothermal source. It is further understood that additional hydrocarbons can be utilized to further increase the superheat of the carbon dioxide containing working fluid. The combustion of these additional hydrocarbons at supercritical pressures enables direct injection of the carbon dioxide exhaust byproducts into the injection well for carbon dioxide sequestration, thus eliminating one of the primary concerns of less than optimal combustion in the era of climate change.

What is claimed is:

1. A geothermal energy system comprising a first geothermal power generator having an extraction well, an injection well, at least one thermodynamic cycle having a first working fluid containing at least carbon dioxide, the at least one thermodynamic cycle having an expander, a condenser, a high-pressure side, a low-pressure side, and a cycle efficiency; and a heat exchanger to superheat the first working fluid containing at least carbon dioxide, a phase separator operable to isolate at least one hydrocarbon from the first working fluid containing at least carbon dioxide upstream of the extraction well, an external combustor operable to combust the at least one hydrocarbon whereby the combusted hydrocarbon superheats the first working fluid containing at least carbon dioxide, and the superheated first working fluid containing at least carbon dioxide is operable to increase the cycle efficiency by at least 5 percent greater than the first geothermal power generator.

2. The geothermal energy system according to claim 1 further comprised of a recuperator operable to preheat the at least one hydrocarbon.

3. The geothermal energy system according to claim 1 further comprised of a liquid atomizer operable to reduce particle size of emitted at least one hydrocarbon diluted by at least 10 percent by volume of the first working fluid containing at least carbon dioxide.

4. The geothermal energy system according to claim 1 further comprised of an oxidant and an oxidant compressor operable to increase the oxidant pressure to a pressure at least 5 psi greater than the low-pressure side pressure.

5. The geothermal energy system according to claim 1 further comprised of an oxidant and an oxidant compressor operable to increase the oxidant pressure to a pressure at least 5 psi greater than the high-pressure side pressure.

6. The geothermal energy system according to claim 1 whereby the expander is a dual stage expander having a first stage and a second stage operable to at least partially isolate the at least one hydrocarbon downstream of the first stage and upstream of the second stage.

7. The geothermal energy system according to claim 1 whereby the expander is an inside-out ramjet expander.

8. The geothermal energy system according to claim 4 whereby the external combustor has a combustion exhaust comprising at least carbon dioxide and wherein the combustion exhaust is injected upstream of the expander.

9. The geothermal energy system according to claim 4 whereby the external combustor has a combustion exhaust comprising at least carbon dioxide and wherein the combustion exhaust is injected upstream of the injection well and downstream of the condenser.

10. The geothermal energy system according to claim 4 whereby the external combustor has a combustion exhaust comprising at least carbon dioxide and wherein the combustion exhaust is injected upstream of the expander.

11. The geothermal energy system according to claim 6 whereby the dual stage expander first stage is operable as both a centrifugal phase separator and expander.

12. The geothermal energy system according to claim 6 further comprised of a phase separator operable to further isolate the at least partially isolated at least one hydrocarbon from water or steam upstream of the external combustor.

13. The geothermal energy system according to claim 7 wherein the inside-out ramjet expander produces a centrifugal force greater than 100 times the gravitational field force.

14. The geothermal energy system according to claim 7 wherein the inside-out ramjet expander produces a centrifugal force greater than 1000 times the gravitational field force.

15. A geothermal energy system comprising: an extraction well, an injection well, at least one thermodynamic cycle having a first carbon dioxide working fluid the at least one thermodynamic cycle having an expander and a cycle efficiency, a condenser, a heat exchanger to superheat the at least one thermodynamic cycle having the first carbon dioxide working fluid using a solar receiver upstream of the expander is operable to superheat the first carbon dioxide working fluid of the at least one thermodynamic cycle, and the superheated first working fluid containing at least carbon dioxide is operable to increase the cycle efficiency by at least 5 percent greater than the first geothermal power generator through the solar receiver.

16. The geothermal energy system according to claim 15 further comprised of an external combustor having a combustion exhaust comprising at least carbon dioxide and wherein carbon dioxide from the combustion exhaust is injected into the first carbon dioxide working fluid of the at least one thermodynamic cycle.

17. The geothermal energy system according to claim 15 further comprised of at least one hydrocarbon from the first working fluid containing at least carbon dioxide and an external combustor operable to combust the at least one hydrocarbon to increase the cycle efficiency by at least 5 percent.

18. The geothermal energy system according to claim 15 further comprised of at least one hydrocarbon from the first working fluid containin at least carbon dioxide and an external combustor operable to combust the at least one hydrocarbon to increase the cycle efficiency by at least 10 percent.

19. The geothermal energy system according to claim 17 whereby the first carbon dioxide working fluid is further comprised of at least 1 percent by volume of solubilized hydrocarbons.

20. A method of producing power from a geothermal source, the method providing a first geothermal power generator comprising a extraction well, an injection well, at least one thermodynamic cycle having a first working fluid containing at least carbon dioxide, the at least one thermodynamic cycle having an expander, a condenser, a high-pressure side, a low-pressure side, and a cycle efficiency; and a heat exchanger to superheat the first working fluid containing at least carbon dioxide, a phase separator operable to isolate at least one hydrocarbon from the first working fluid containing at least carbon dioxide upstream of the extraction well, an external combustor operable to combust the at least one hydrocarbon whereby the combusted hydrocarbon superheats the first working fluid containing at least carbon dioxide, and the superheated first working fluid containing at least carbon dioxide is operable to increase the enthalpy by at least 5 percent greater than the first geothermal power generator.

* * * * *